United States Patent [19]
Isaka et al.

[11] Patent Number: 5,921,585
[45] Date of Patent: Jul. 13, 1999

[54] BLOCKADE SEAL

[75] Inventors: Isao Isaka, Izumi; Takao Tanaka, Osaka, both of Japan

[73] Assignee: Attention System Co., Ltd., Osaka-fu, Japan

[21] Appl. No.: 08/969,902

[22] Filed: Nov. 13, 1997

[30] Foreign Application Priority Data

Jul. 29, 1997 [JP] Japan ............................... 9-007201 U

[51] Int. Cl.⁶ .................................................. B42D 15/00
[52] U.S. Cl. ................................. 283/114; 283/95; 283/94
[58] Field of Search ................................. 283/72, 86, 93, 283/94, 95, 96, 98, 99, 114

[56] References Cited

U.S. PATENT DOCUMENTS

| | | | |
|---|---|---|---|
| 1,525,754 | 11/1925 | Le Page | 283/115 |
| 3,858,705 | 1/1975 | Reitano | 197/172 |
| 4,700,491 | 10/1987 | Rhea, Jr. | 33/494 |
| 4,837,061 | 6/1989 | Smits et al. | 283/95 X |
| 4,846,503 | 7/1989 | Strauss | 283/70 |
| 4,856,820 | 8/1989 | Kasprzak et al. | 283/81 |
| 5,015,318 | 5/1991 | Smits et al. | 283/95 X |
| 5,083,816 | 1/1992 | Folga et al. | 283/81 |
| 5,325,293 | 6/1994 | Dorne | 364/413.01 |
| 5,426,289 | 6/1995 | Kinoshita et al. | 235/469 |
| 5,451,079 | 9/1995 | Gong et al. | 283/115 |
| 5,483,443 | 1/1996 | Milstein et al. | 364/401 |
| 5,524,934 | 6/1996 | Schwan et al. | 283/95 |
| 5,576,528 | 11/1996 | Chew et al. | 235/469 |
| 5,698,296 | 12/1997 | Dotson et al. | 283/95 X |
| 5,805,505 | 9/1998 | Schwan et al. | 283/95 X |

FOREIGN PATENT DOCUMENTS

| | | | |
|---|---|---|---|
| 2343297 | 9/1977 | France | 283/114 |

OTHER PUBLICATIONS

*Documentation Guidelines for Evaluation and Management Services,* American Medical Association, Health Care Financing Administration, Nov., 1997, pp. 1–50.
Gottlieb, Howard, "Compliance programs make good business sense", *Ocular Surgery News*, pp. 29–30.
Martin, Sean, "AMA acts to quell E&M flap", *American Medical News,* vol. 41, No. 9, Mar. 2, 1998, pp. 12 & 22.
Wooten, M.D., Percy, "AMA Respone to E&M documentation guidelines", *American Medical News*, vol. 41, No. 9, Mar. 2, 1998, pp. 17 & 19.
*HCFA Common Procedures Coding System,* Office of Health Care Information System, HHS–HCF–00458, May 8, 1996.
*Central Office on ICD–9–CM,* Coding Clinic Newsletter.
Seward, P. John, MD, "Grassroots Political Action", *American Medical Association Journal,* Feb. 4, 1997.

*Primary Examiner*—Willmon Fridie, Jr.
*Attorney, Agent, or Firm*—Graham & James LLP

[57] ABSTRACT

A blockade seal includes a sheet substrate having a hologram forming surface on one surface thereof. A metallic deposition layer is formed on the hologram forming surface, and an adhesive layer is formed thereon. A releasing layer in which ink is filled is formed on the other surface of the sheet substrate. Ink which exhibits a color when it comes into contact with the atmosphere is filled in the releasing layer. A surface layer is formed on the releasing layer.

9 Claims, 7 Drawing Sheets

BLOCKADE SEAL

BACKGROUND OF THE INVENTION

1. Field of the Invention

This invention relates to a blockade seal, and more particularly, to a blockade seal for use for sealing an envelope or as a light shielding seal of a ROM.

2. Description of the Prior Art

Conventionally, a blockade seal to be attached to an envelope of the registered mail has been used. The blockade seal is intended to prevent a third person from opening the envelope containing, for example, cash. Further, a blockade seal to be attached to an envelope containing an important document, a blockade seal to be attached to the CPU control box of a pinball machine, a blockade seal for light shielding of a ROM and the like have been used to protect a content located inside thereof. Some types of these blockade seals are printed in individual manners to indicate that the blockade seals have their own purposes or for identification.

However, because the conventional blockade seals are produced by printing on the sheets, such blockade seals can be forged easily. Additionally, these blockade seals are attached to envelopes by adhesive, and they can be removed easily without leaving a trace of such removal. If such a trace of the removal is not seen, it is impossible to make sure whether a blockade seal was attached initially, so that a third person can open the envelope without such unauthorized opening being detected by others. Further, when the blockade seal is forged, if that forged blockade seal is attached after a proper seal is removed and an envelope is opened, it is impossible to make sure that the envelope was kept confidential.

SUMMARY OF THE INVENTION

To overcome the problems described above, the preferred embodiments of the present invention provide a blockade seal which is difficult to forge and clearly leaves a trace of removal if it is removed.

According to preferred embodiments of the present invention, there is provided a blockade seal including a sheet substrate having a hologram forming surface on a first surface thereof; a releasing layer on the other surface of the sheet substrate, ink contained in the releasing layer; and a surface layer on the releasing layer, wherein the ink exhibits a color in response to making contact with the atmosphere.

In this blockade seal, the hologram forming surface has unevenness on one surface of the sheet substrate, and a metallic deposition layer is formed on the hologram forming surface.

The hologram forming surface may preferably be formed of a Fourier transformation hologram. The hologram forming surface is desired to be formed by a laser beam transmitted through a wavelength transformation device.

The releasing layer is preferably formed by filling the ink in concave portions provided in a surface of the releasing layer.

Ink which is transparent before it comes into contact with the atmosphere may be used.

Ink which exhibits different colors before and after it comes into contact with the atmosphere may be used, and in this case, characters or graphics may be formed by that ink.

Characters or graphics may be printed on the surface layer.

An adhesive layer may be formed on the metallic deposition layer.

Because there is a hologram forming surface on one side of the sheet substrate, this blockade seal is more difficult to forge than a blockade seal which is simply printed. The hologram forming surface has unevenness on one surface of the sheet substrate and the metallic deposition layer is formed thereon. As a result, light impinging from the other surface of the sheet substrate is reflected by the metallic deposition layer, so that the hologram image can be seen from the other side of the sheet substrate.

The hologram forming surface can be formed by a Fourier transformation hologram. Particularly, if it is formed by a laser beam transmitted through a wavelength transformation device, the image cannot be reproduced until a laser beam passing through the same wavelength transformation device is irradiated.

Because ink is filled in concave portions provided in the releasing layer, when the blockade seal is removed, the surface layer is released at the releasing layer, so that the ink filled in the releasing layer comes into contact with the atmosphere. Because this ink exhibits a color when it comes into contact with the atmosphere, it is possible to confirm that someone tried to remove the blockade seal by that exhibited color.

If ink which is transparent before it comes into contact with the atmosphere is used, usually the hologram image can be seen, and only when the blockade seal is released, the ink produces a color.

Further, if ink which exhibits different colors before and after it comes into contact with the atmosphere, usually characters and graphics formed by the ink and the hologram image can be seen, and only when the blockade seal is released, ink producing a different color can be seen.

If characters or graphics are printed on the surface layer, the characters or graphics and the hologram image can be seen. only when the blockade seal is released, coloration of the ink can be seen. By forming the adhesive layer on the metallic deposition layer on the hologram forming surface, no adhesive agent needs to be applied when the blockade seal is attached. Thus, the blockade seal can be attached easily to an envelope or the like.

According to preferred embodiments of the present invention, it is possible to prevent forging of a blockade seal. Additionally, if a third person or unauthorized person releases the blockade seal, such unauthorized activity cannot be concealed. Thus, the security of a content inside can be assured. Further, this blockade seal can be widely used for objects whose content is desired to be protected.

The aforementioned features and advantages of the present invention will become further evident from a detailed description with reference to the attached drawings.

DETAILED DESCRIPTION OF PREFERRED EMBODIMENTS

Figure 1:
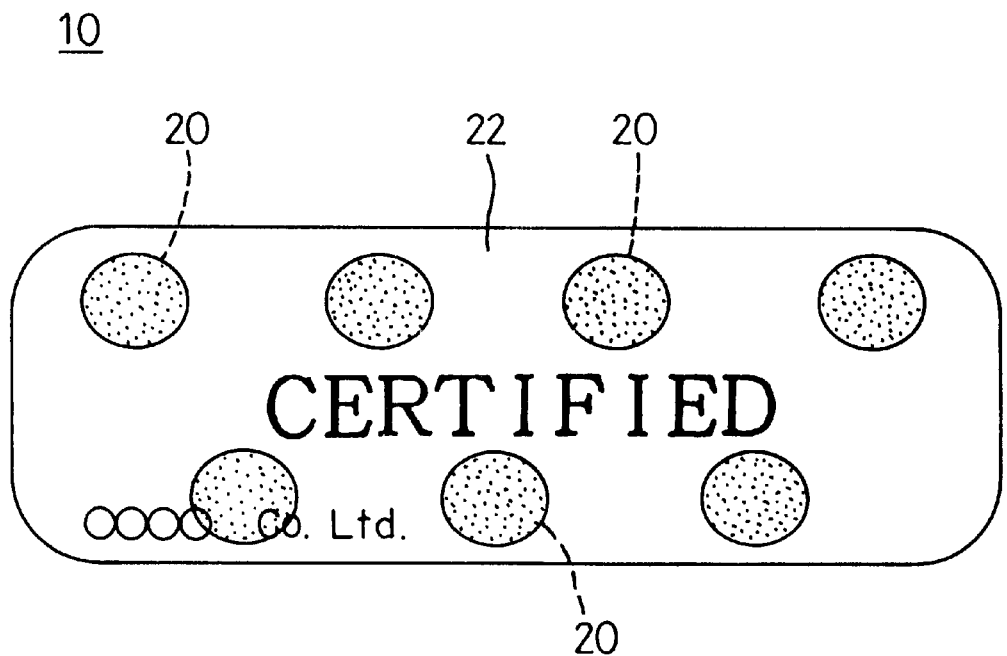
FIG. 1 is a plan view showing an example of a blockade seal of a preferred embodiment of the present invention.
Figure 2:
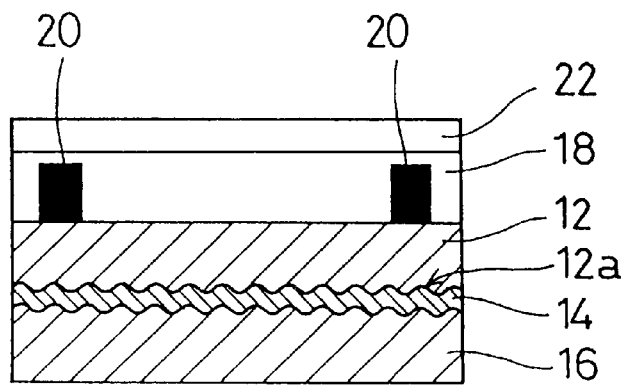
FIG. 2 is a sectional view of the blockade seal shown in FIG. 1.

FIG. 1 is a plan view showing an example of a blockade seal of a preferred embodiment of the present invention, and FIG. 2 is a sectional view thereof. The blockade seal 10 includes a sheet substrate 12 preferably formed of a transparent synthetic resin or the like. On one side of the sheet substrate 12, an uneven surface is formed for serving as a hologram forming surface 12a. The hologram forming surface 12a is a surface for recording interference fringes formed by an object beam passing a photographic original plate in which characters or graphics are formed and a reference beam irradiated at an angle with respect thereto, so as to have an uneven surface. On the hologram forming surface 12a in which the uneven surface is formed, a metallic deposition layer 14 is formed by depositing a metal such as aluminum by means of vacuum evaporation. Further, an adhesive layer 16 is formed on the metallic deposition layer 14.

On the other side of the sheet substrate 12 upon which the metallic deposition layer 14 is not formed, a releasing layer 18 comprising a release agent is formed. Concave portions are formed in the releasing layer 18 on the other side of the sheet substrate 12, and ink 20 is filled in the concave portions. The ink 20 is preferably a special ink which is transparent when it is filled, and produces a color by reacting with moisture in the atmosphere when the ink comes into contact with the atmosphere. Further, a surface layer 22 is preferably formed of synthetic resin or the like on the releasing layer 18. The releasing layer 18 and the surface layer 22 are preferably formed of transparent material. It is permissible to print characters such as "CERTIFIED" or a corporate name or a graphic pattern on the surface layer 22.

Figure 3A:
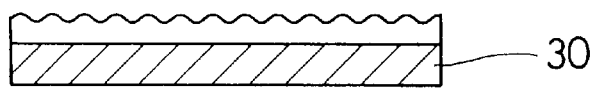
FIGS. 3(A)–3(H) are sectional views illustrating production steps for the blockade seal shown in FIG. 1.
Figure 4:
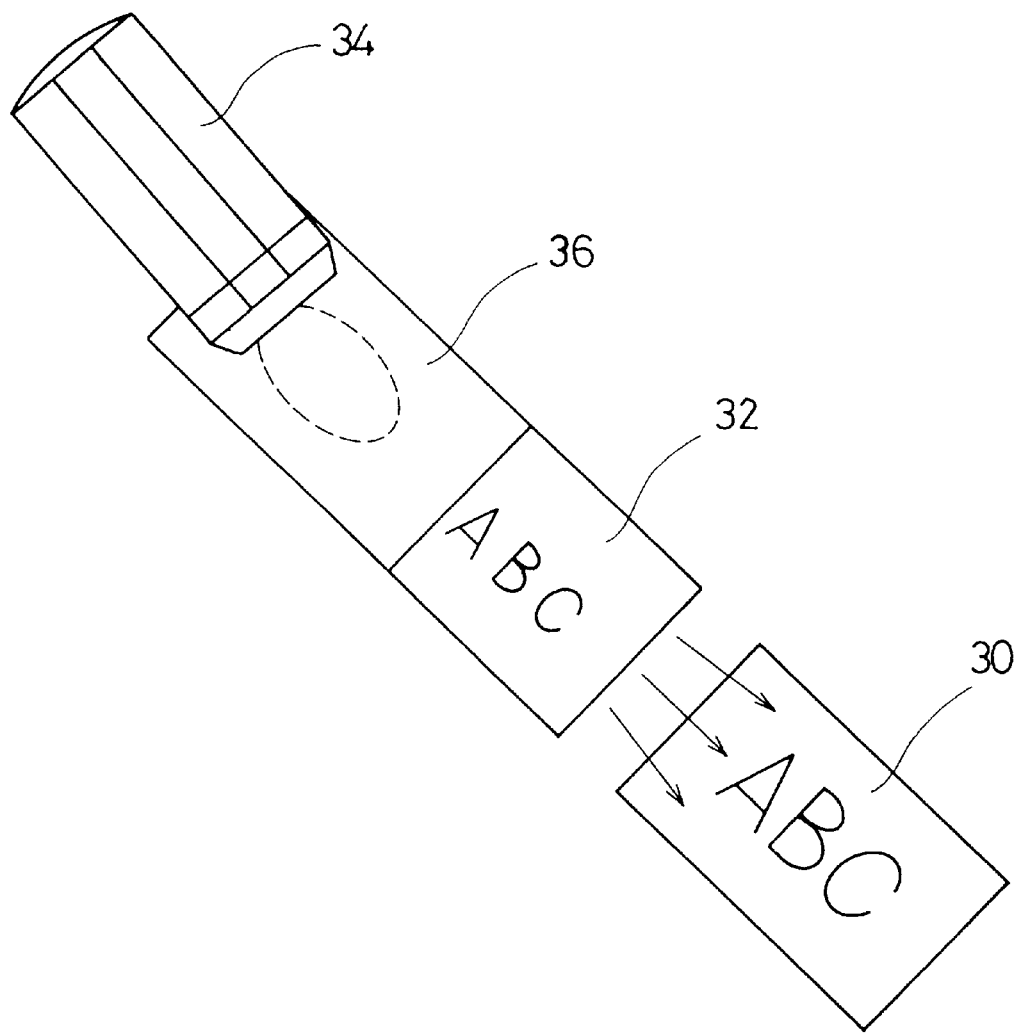
FIG. 4 is an explanatory view showing a production step for an original plate for use in production step of the blockade seal shown in FIG. 3.

As a first step for producing the blockade seal 10, as shown in FIG. 3(A), an original plate 30 on which hologram is to be formed is prepared. For forming a hologram, an object beam is obtained by transmitting a laser beam through a photographing original plate 32 in which characters or graphics are formed, and the object beam is irradiated upon a photographic dry plate as seen in FIG. 4. At the same time, a reference beam is irradiated upon the photographic dry plate at an angle with respect to the object beam. As a result, the object beam and reference beam interfere with each other so as to form interference fringes on the photographic dry plate. The interference fringes cause unevenness in production of the original plate 30. In one example, a Fourier transformation hologram is preferably utilized. In the case of the Fourier transformation hologram, the hologram image cannot be reproduced until a laser beam having the same wavelength as that used at the time of photographing is irradiated.

As shown in FIG. 4, the object beam and reference beam for use in forming the hologram are produced by transmitting a laser beam output from the laser beam projector 34 through the wavelength transformation device 36. In FIG. 4, only the object beam is indicated while the reference beam is omitted. The wavelength transformation device 36 utilizes a characteristic of the lens, and is capable of displacing the phase of laser beam output from the laser beam projector 34 by ½ the wavelength or ¼ the wavelength. Because the phase of laser beam is displaced when the hologram is formed, the hologram image cannot be reproduced unless the same laser beam used to displace the phase is irradiated at the time of reproduction of the hologram image.

Figure 3B:
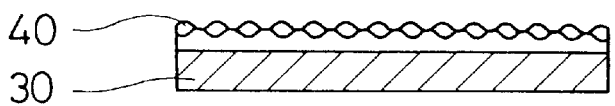
Figure 3C:
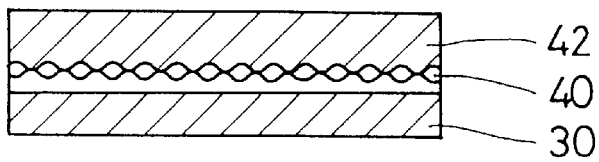
Figure 3D:
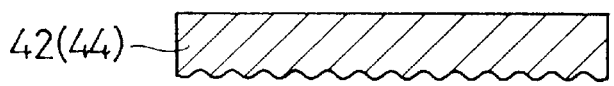
Figure 3E:

As shown in FIG. 3(B), by depositing metals such as Au, Ag on the original plate 30 by means of vacuum evaporation, a metallic layer 40 having conductivity is formed. Further, as shown in FIG. 3(C), a nickel plating layer 42 is formed of nickel on the metallic layer 40. Then, as shown in FIG. 3(D), the nickel plating layer 42 is released and utilized as a mold 44. Next, by thermally pressing a thermal plastic resin onto the mold 44 as shown in FIG. 3(E), the sheet substrate 12 having the hologram forming layer 12a including the uneven surface is obtained.

Figure 3F:
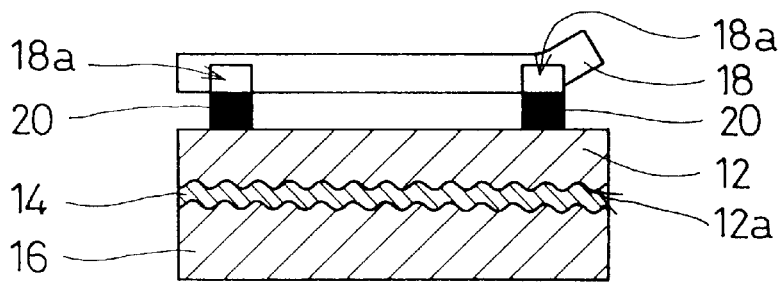

As shown in FIG.3(F), a metal such as Al is deposited by means of vacuum evaporation on the hologram forming layer 12a of the sheet substrate 12 so as to form the metallic deposition layer 14. Then, the adhesive layer 16 is formed on the metallic 20 deposition layer 14. On a surface of the sheet substrate 12 upon which the metallic deposition layer 14 is not formed, the releasing layer 18 is formed of a transparent releasing sheet. Upon forming this releasing layer 18, a concave portion 18a is formed in this releasing layer 18 and then the ink 20 is filled in this concave portion 18a. As described previously, this ink preferably only exhibits color by making contact with the atmosphere. The ink may be transparent ink or color ink before it exhibits its color. If the color ink is used, the ink 20 can be filled such that it forms characters or graphics when viewed through the surface of the blockade seal 10.

Figure 3G:
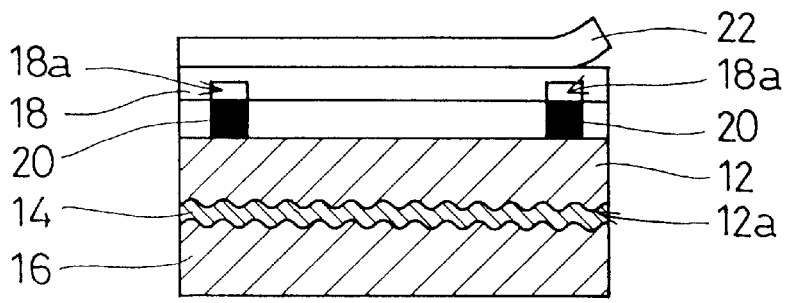
Figure 3H:
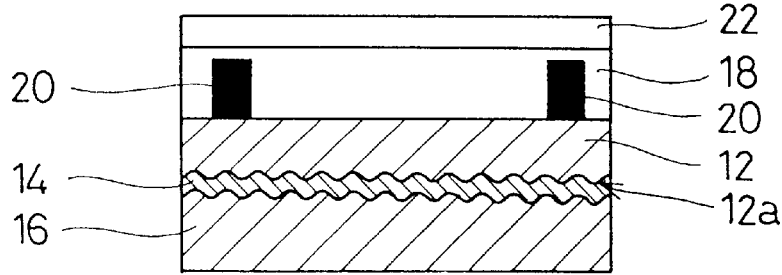

Further, as shown in FIG. 3(G), a surface layer 22 is formed on the releasing layer 18. The surface layer 22 is formed of, for example, a transparent synthetic resin. In this process, as shown in FIG. 3(H), the blockade seal 10 is formed. Meanwhile, it is permissible to form characters or graphics on the surface layer 22. In this case, a transparent ink is preferably used as the ink 20 in the releasing layer 18. However, it is also permissible to use color ink even if the surface layer 22 is printed. The blockade seal 10 formed in the above described process preferably has a thickness of only several micrometers including all the formed layers. Thus, there is a relatively small step or difference in level produced when this blockade seal is attached to an object.

Figure 5:
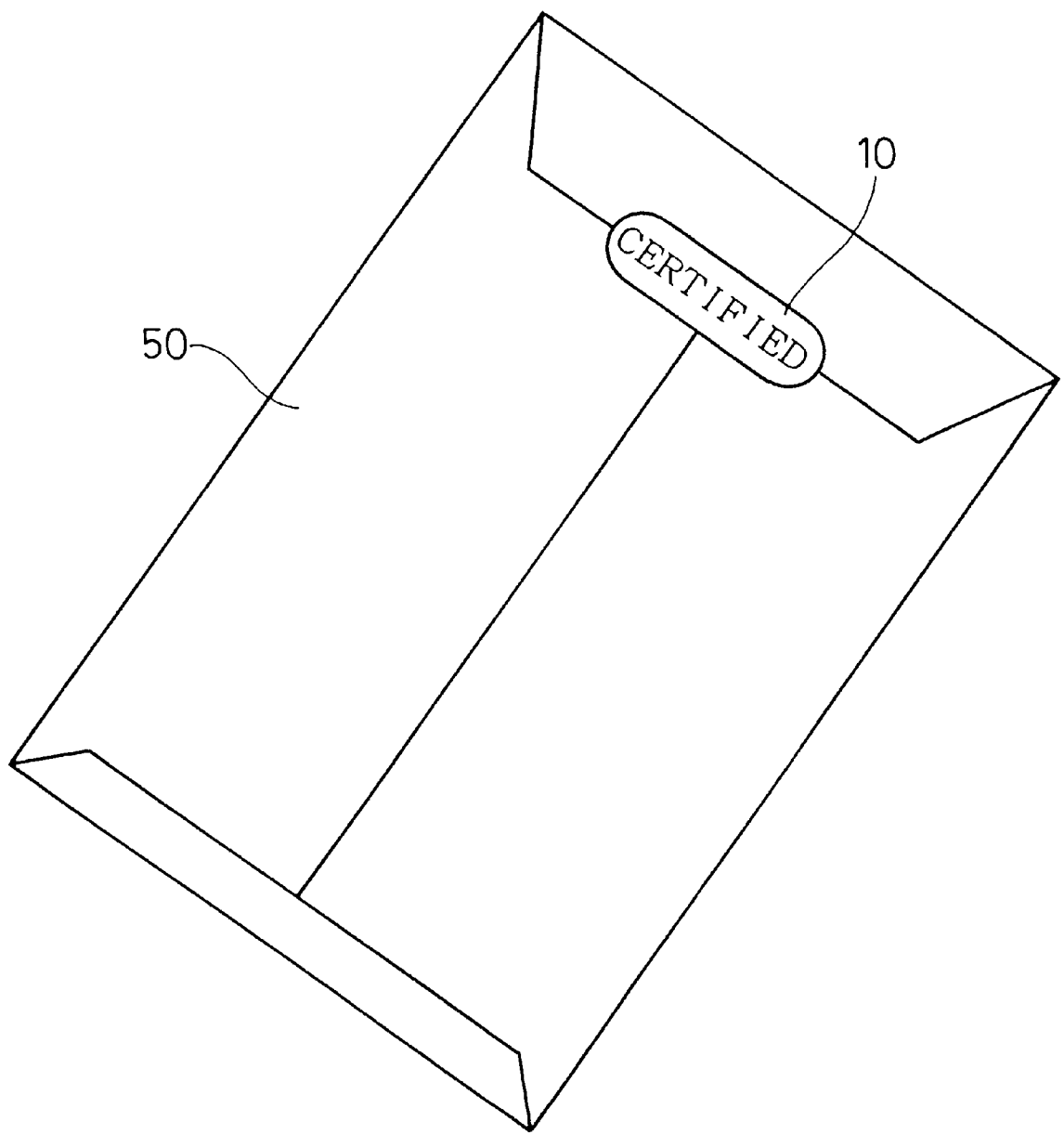
FIG. 5 is an explanatory view showing an example in which the blockade seal shown in FIG. 1 is used for an envelope.
Figure 6:
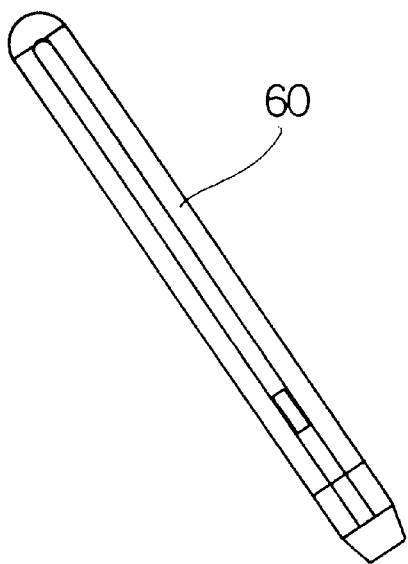
FIG. 6 is an explanatory view showing a state in which a hologram image of the blockade seal is reproduced by a recognizing device.
Figure 6:
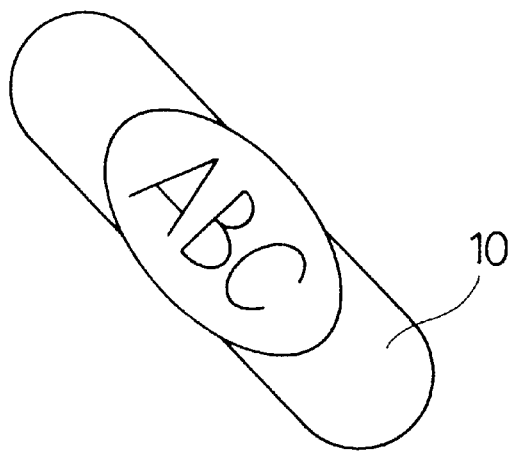
Figure 7:
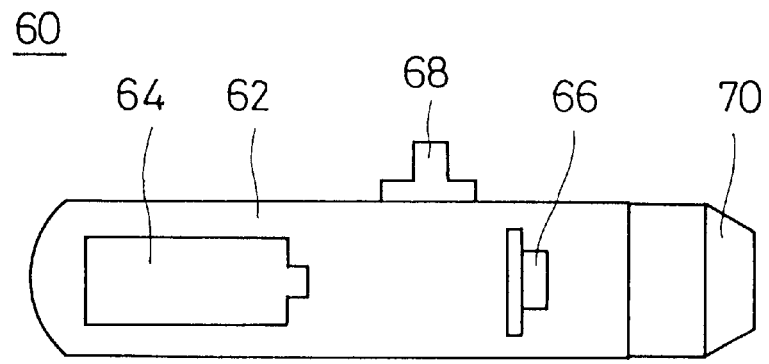
FIG. 7 is an explanatory view showing the recognizing device shown in FIG. 6.

This blockade seal 10 is preferably used to seal an envelope 50 containing a confidential content as shown in FIG. 5. The hologram image created on the blockade seal 10 is reproduced by means of a recognizing device 60 as shown in FIG. 6. The recognizing device 60 includes a case 62 as shown in FIG. 7. The case 62 contains a driving battery 64 and a semiconductor laser device 66. The semiconductor laser device 66 is excited by a switch 68 to output a laser beam. A wavelength transformation device 70 is mounted in a laser beam passage so as to displace the phase of the laser beam. This semiconductor laser device 66 produces a laser beam of the same wavelength as that of the laser beam projector. The wavelength transformation device 70 is a wavelength transformation device capable of carrying out the same displacement in phase as the wavelength transformation device used upon forming the hologram.

By operating this recognizing device 60, the semiconductor laser 66 emits a laser beam, and the laser beam is displaced in phase by the wavelength transformation device 70. When the laser beam emitted from the recognizing device 60 is irradiated to the blockade seal 10, the beam is reflected by the metallic deposition layer 14 on the hologram forming layer of the sheet substrate 12. As a result, the hologram image is reproduced so that this is recognized to be a proper blockade seal 10. This indicates that document contained in the envelope 50 has not been viewed by a third person.

Because the laser beam emitted from the semiconductor laser device 60 has been displaced in phase by the wavelength transformation device 70, if an amount of this phase displacement is not known, the hologram image on the blockade seal 10 cannot be reproduced. Thus, if an image relating to a certain person is used as the hologram image, it is possible to prevent the blockade seal from being forged by a third person.

When the blockade seal 10 is released by a third person or unauthorized person, the sheet substrate 12 and the surface layer 22 are separated at the releasing layer 18. At this time, the ink 20 filled in the releasing layer 18 is exposed and exhibits a color by coming into contact with the atmosphere, thereby indicating that this envelope has been opened by an unauthorized person. Thus, the third or unauthorized person cannot see document in the envelope without being noticed by anyone.

Because it is difficult to forge the blockade seal 10, the blockade seal 10 secures the privacy of a content in the envelope. Further, even if the third person releases the blockade seal 10, it cannot be hidden. Thus, nobody can see a content in the envelope without being noticed by a proper authorized person. Thus, use of this blockade seal 10 can ensure the security of a content in the envelope.

Figure 8:
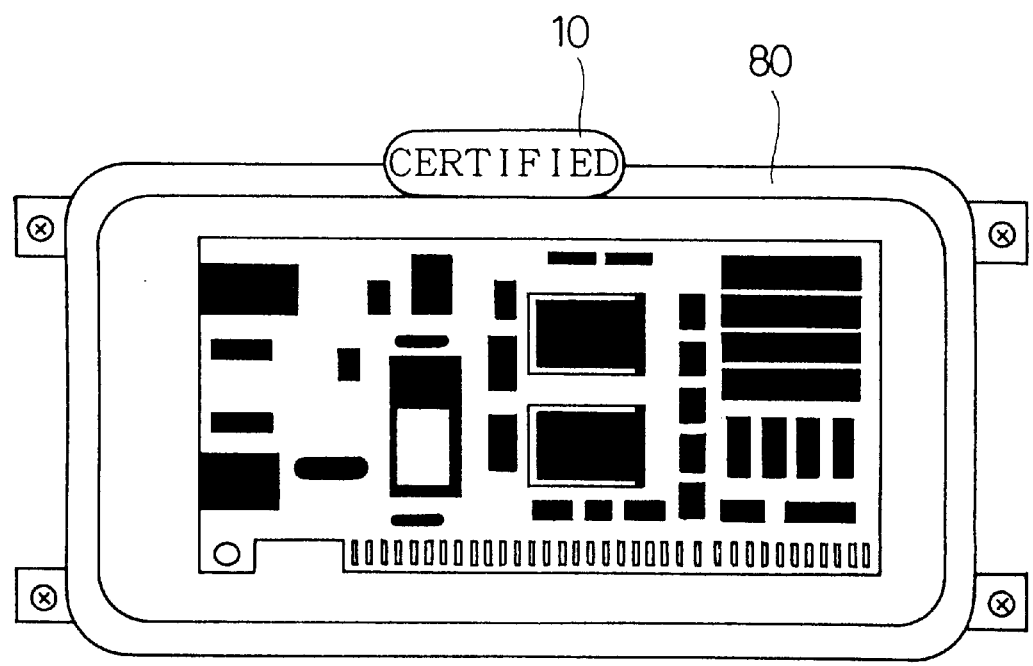
FIG. 8 is an explanatory view showing an example in which the blockade seal shown in FIG. 1 is used for sealing a control board.
Figure 9:
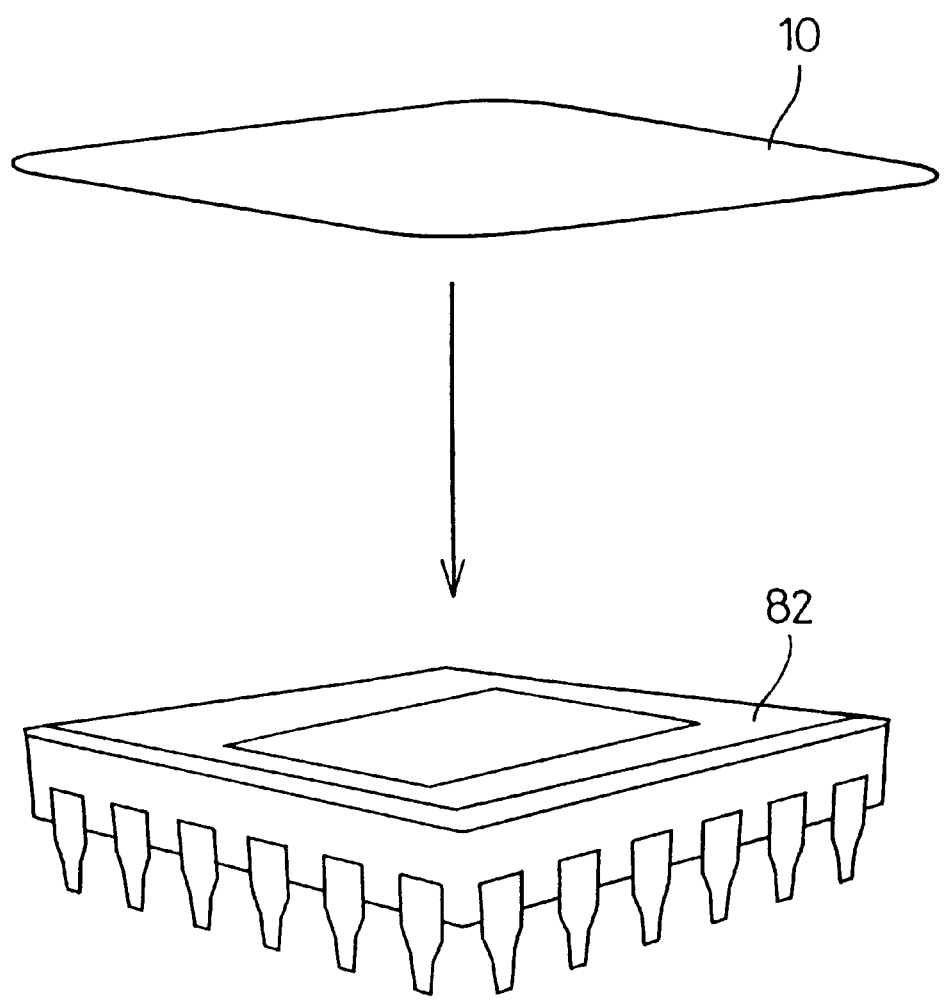
FIG. 9 is an explanatory view showing an example in which the blockade seal shown in FIG. 1 is utilized as a light shielding seal for the ROM.

This blockade seal 10 is not only used for sealing the envelope, but also it may be used for sealing a control board 80 in a pinball machine as shown in FIG. 8, a light shielding seal of the ROM 82 as shown in FIG. 9, and sealing a household appliance related to product liability, cash envelopes and registered mails under control of the Ministry of Posts and Telecommunications. Further, in addition to these uses, the blockade seal 10 of the preferred embodiments of the present invention can be used for all applicants where contents are desired to be protected.

Although the present invention has been described and illustrated in detail above, these are used as only an example or illustration thereof, and it is apparent that the present invention is not restricted to these examples. The spirit and scope of the present invention are restricted by only a description in the attached claims.

What is claimed is:

1. A blockade seal comprising:
    a sheet substrate having a first surface and a second surface and including a hologram forming surface on the first surface thereof;
    a releasing layer on the second surface of said sheet substrate and ink contained in the releasing layer;
    a surface layer on said releasing layer; wherein
    said ink exhibits a color by making contact with the atmosphere.

2. A blockade seal according to claim 1, wherein said hologram forming surface includes an uneven portion on the first surface of said sheet substrate, and a metallic deposition layer is disposed on said hologram forming surface.

3. A blockade seal according to claim 2, wherein said hologram forming surface is a Fourier transformation hologram.

4. A blockade seal according to claim 1, wherein said hologram forming surface is formed by a laser beam transmitted through a wavelength transformation device.

5. A blockade seal according to claim 1, wherein said releasing layer is formed by filling said ink in concave portions formed in a surface thereof.

6. A blockade seal according to claim 1, wherein said ink is transparent before it comes into contact with the atmosphere.

7. A blockade seal according to claim 1, wherein said ink exhibits different colors before and after the ink comes into contact with the atmosphere, and characters or graphics are formed by said ink.

8. A blockade seal according to claim 6, wherein characters or graphics are printed on said surface layer.

9. A blockade seal according to claim 2, wherein adhesive layer is formed on said metallic deposition layer.

* * * * *